UNITED STATES PATENT OFFICE.

LEONARD PAGET, OF NEW YORK, N. Y.

PYROXYLINE SOLUTION.

SPECIFICATION forming part of Letters Patent No. 507,749, dated October 31, 1893.

Application filed August 3, 1893. Serial No. 482,249. (No specimens.)

*To all whom it may concern:*

Be it known that I, LEONARD PAGET, a citizen of the United States, residing in the city, county, and State of New York, have invented certain new and useful Improvements in Pyroxyline Solutions, of which the following is an exact, full, and clear description.

The object of my invention is, first, to improve in solvent power those weak solvents of soluble nitro-cellulose or pyroxyline that are otherwise from their characteristic volatility and other properties useful in the art, but which are too weak in solvent power to become usefully employed in their normal condition; secondly, to impart solvent power to menstrua otherwise non-solvent without addition to their volume or bulk or without material change in their practical properties; thirdly, to render certain solvent essential oils that are impaired in their utility in the art by reason of their fixed or non-volatile character, more easily drying or siccative; fourthly, to determine in those camphoraceous oils and balsams such development of the so-called camphor as may bring about, in conjunction with alcohol, fusel oil, and other inactive solvents, an active agent for the solution of soluble pyroxyline. The desirability of these ends is in the art fully recognized.

I have found that these ends are attained by selecting suitable menstrua (which are or are not solvents as may be best suited to the particular case) and submitting the menstrua or menstruum to an ozonizing process. While the material treated may and does vary according to the product desired and its application, and while the method of applying the ozone may and does vary according to the character of the material to which it is applied, the ozone itself is always used as ozone and never as oxygen, and is generated as ozone as a distinct and separate entity, and is not applied as ozone liberated or set free by chemical reaction within the liquid or the liquid equivalent under treatment. It is further requisite not only that ozone should be merely present in the course of the treatment which is the subject of my invention, but it must exist in considerable quantity and generally very much in excess of what might be judged to be a theoretically chemical combining proportion as calculated from the hypothetical reactions of oxidation assumed to occur in a given result. Otherwise I have met with failure in my trials. This condition therefore in the present state of chemical science practically limits the means of producing the ozone employed to the electrification of oxygen gas; and it is necessary that the ozone be used dry, that is, free from aqueous vapor. In certain cases its temperature may be advantageously raised above the atmospheric temperature, to within say 120° Fahrenheit, but generally full effects will be produced at ordinary atmospheric temperatures. While the temperature of the gas may be increased with advantage, it is not to be implied that the temperature of the material treated can also be advantageously raised, because the contrary is generally the case, and it may be stated as a general instruction that the menstruum or menstrua under treatment are best artificially cooled to below ordinary atmospheric temperature, and to a degree differing with the substance treated.

The method of treating a given menstruum differs with the nature of the menstruum. For instance, it suffices ordinarily to pass a current of ozone through the liquid menstruum in the manner well known in chemical manipulation, accelerating the passage of the same by aspiration or pressure; but in cases where the menstruum quickly yields solid or semi-solid products of ozonization, or in cases where a viscid liquid such as one of the viscid essential oils is to be treated to render it more quickly drying, the bubbles of gas in their passage through the menstruum are apt to become coated or surrounded with a film of some tenacity, which causes a waste of the gas by preventing its further action on the menstruum, after such a film is formed, as well as spurting at the surface of the liquid when the bubble breaks there, and the formation of a scum or skin on the surface of the liquid hindering the passage of the gas. In such cases it is preferable to inject the menstruum as a spray into a chamber in which an ozone atmosphere is maintained.

I wish it to be distinctly understood as an induction to which I have been led by my researches, and from theoretical considerations that would be out of place if stated in the specification of a Letters Patent, that I do not consider the treatment with ozone to which the menstrua are subjected as a process of mere oxidation, because I have found that the ozone enters into solution and becomes in many instances compounded into the substance ultimately formed; and whether the result may be brought about as the result of a solution of ozone, or as the result of compounding ether with ozone or with allotropic oxygen is immaterial to my claim, and as relates to my invention in procuring solvents and solutions of pyroxyline.

To instance applications of my invention, I cite the following, but I do not limit myself to the mentioned applications, because it is obvious that my invention is applicable to so many of the series of essential oils as are too numerous to include, and the principle being given a chemist skilled in this branch of his art can readily apply the same:

Oil of turpentine is practically non-solvent of pyroxyline; treated with ozone to saturation it becomes an active solvent.

Oil of camphor is greatly increased in solvent power by being sprayed into a chamber or vessel in which an ozone atmosphere is maintained.

Oil of caraway-seed, which is practically non-drying though a good solvent of pyroxyline, becomes possessed of drying properties.

Methyl alcohol that gives cloudy films and a pitted and striated character to the films from solutions in which it enters too largely, when treated with ozone yields a clear film, and becomes possessed of greater solvent power, as indicated by the greater fluidity of a solution containing like amount of pyroxyline to one made with methyl alcohol not so treated. Acetone is rendered a more certain solvent by ozone treatment.

Acetal yields after treatment with ozone a clear solution and not a merely disintegrated mass as occurs with pyroxyline dissolved in acetal not so treated.

Ethyl-amyl ether saturated with ozone becomes a powerful solvent of soluble pyroxyline.

Fusel oil which is non-solvent of pyroxyline becomes to a certain degree solvent when treated with ozone.

While my invention is intended to apply more particularly to liquid solutions of pyroxyline, I do not limit myself to such liquid solutions, because I can by suitable modifications produce masses pre-eminently suited to the manufacture of solid compounds. For instance, by placing in a chamber soluble pyroxyline and by introducing into that chamber the vapor of camphene together with ozone and a very finely divided spray of an alcohol, the pyroxyline is very rapidly converted under the influence of the vapor of camphor that is formed, and becomes a converted mass containing the smallest possible quantity of the alcohol (which under certain mechanical manipulation may be omitted). In this case camphene is the menstruum in the vapor condition.

Having described my invention, what I claim, and desire to secure by Letters Patent, is—

1. A solution of pyroxoline consisting of pyroxyline dissolved in an ozonized menstruum.

2. A compound of pyroxyline consisting of pyroxyline converted in an ozonized menstruum.

3. A solution, or compound of pyroxyline consisting of pyroxyline, a solvent and an ozonized menstruum.

LEONARD PAGET.

Witnesses:
W. F. LIVERMORE,
M. E. EASTON.